US009749127B1

(12) United States Patent
Doane et al.

(10) Patent No.: US 9,749,127 B1
(45) Date of Patent: Aug. 29, 2017

(54) ESTABLISHING ENTROPY ON A SYSTEM

(71) Applicant: Amazon Technologies, Inc., Reno, NV (US)

(72) Inventors: Andrew Jeffrey Doane, Vienna, VA (US); Todd Lawrence Cignetti, Ashburn, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/294,997

(22) Filed: Jun. 3, 2014

(51) Int. Cl.
*H04L 29/06* (2006.01)
*H04L 9/00* (2006.01)
*H04L 29/08* (2006.01)
*G06F 7/58* (2006.01)

(52) U.S. Cl.
CPC .............. *H04L 9/002* (2013.01); *G06F 7/582* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 6,385,727 B1* | 5/2002 | Cassagnol et al. | 713/193 |
| 8,381,272 B1* | 2/2013 | Nelson | H04L 9/0861 |
| | | | 705/18 |
| 8,418,235 B2* | 4/2013 | Sherkin et al. | 726/5 |
| 2011/0153861 A1* | 6/2011 | Chauhan | 709/232 |
| 2013/0125114 A1* | 5/2013 | Frascadore | 718/1 |

* cited by examiner

*Primary Examiner* — Brandon Hoffman
(74) *Attorney, Agent, or Firm* — Davis Wright Tremaine LLP

(57) ABSTRACT

Servers in datacenters, mobile devices and virtualized servers without human interaction may experience difficulties in establishing entropy in a virtualized computing environment. Entropy is an important foundation for cryptography and a lack of entropy has led to weaknesses that can be used to break cryptographic systems in the past.

19 Claims, 8 Drawing Sheets

ESTABLISHING ENTROPY ON A SYSTEM

BACKGROUND

The security of computing resources and associated data is of high importance in many contexts. As virtualized computing environments are becoming a new mainstream method for providing users with virtual computer systems, such as virtual machines and containers, which are quickly taking the place of hard devices. However, security in a virtualized environment is quite different with the previous computer security control problems. Current methods for providing security in a computing environment using differing cryptographic techniques require constant maintenance and human-interaction to carefully monitor for possible attacks. Cryptosystems depend on the source of randomness being truly random; as pseudorandom number generators work by taking a seed value and computing a sequence of pseudorandom numbers using an algorithm, knowing the random seed can lead to an attacker to be able to predict the entire sequence. Therefore, it is important that the seed be truly random and the seed be private from potential attackers.

BRIEF DESCRIPTION OF THE DRAWINGS

Various embodiments in accordance with the present disclosure will be described with reference to the drawings, in which.

DETAILED DESCRIPTION

Figure 1:
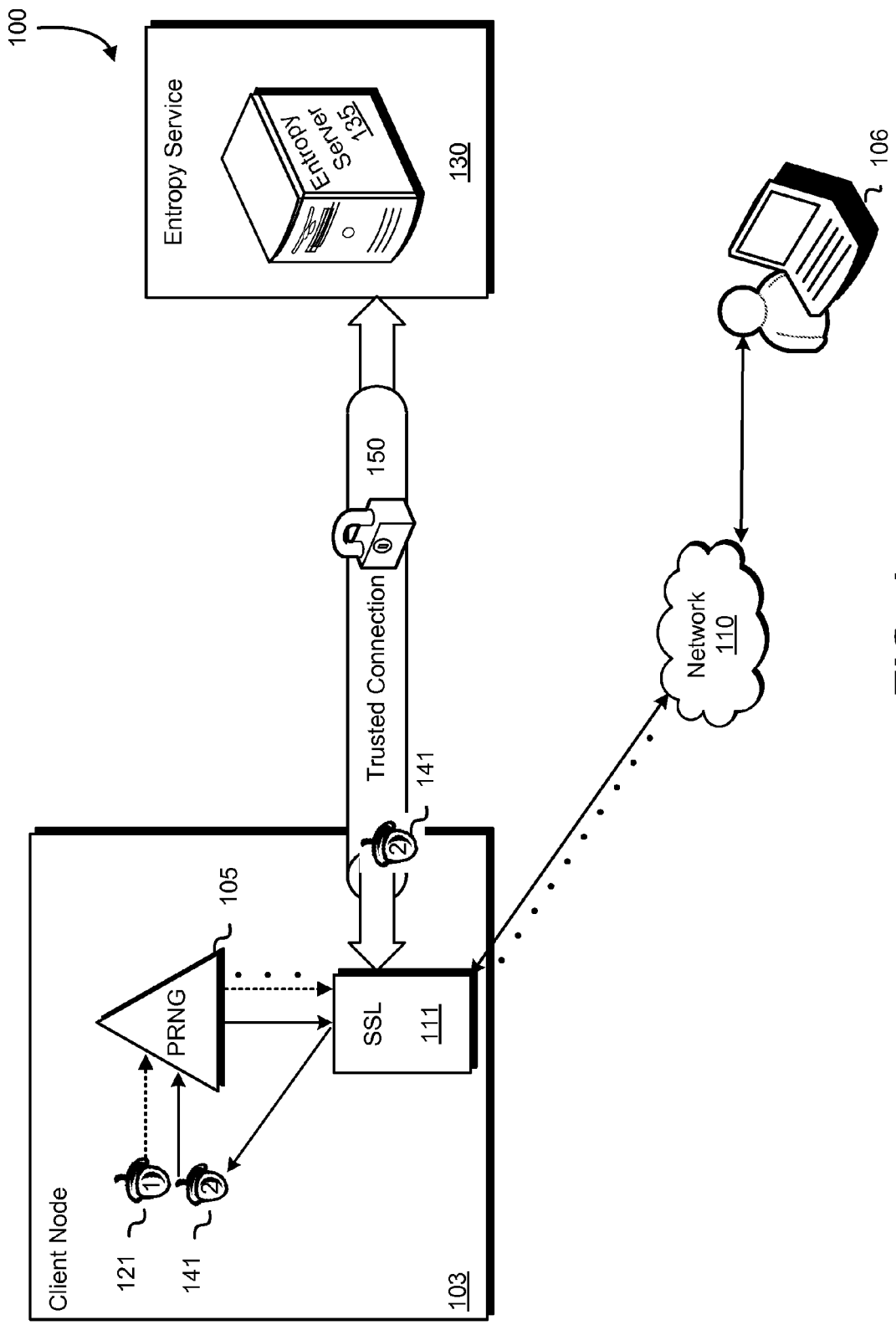
FIG. 1 shows an illustrative example of an environment in which various embodiments may be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods and systems for generating a secure connection using multiple seeds in a tiered cryptographic operation for computing environments. Techniques described herein further include methods and systems for providing virtual computer systems in a computing environment with additional entropy.

Various embodiments of the present disclosure include distributed computing environments that include cryptography services that are implemented using appropriate computing resources. A cryptography service may be implemented as a computer system that receives and responds to electronic requests to perform cryptographic operations to improve the amount of available entropy in a virtual computing environment. Example embodiments presented herein may apply in both physical (hardware) machines as well as virtual computer systems, such as virtual machines. While many of the below examples refer to the virtual computer systems, it will be known to those of ordinary skill in the art that physical computing environments may similarly benefit from examples presented herein.

In computing environments, entropy generally refers to the amount of randomness or uniqueness available. In some example embodiments presented herein, lower amounts of entropy means there is less uniqueness for creating cryptographic random number seeds for initiating secure connections. As the random seed is an important component of cryptographic security to defend against attacks on data communicated in networks, the quality of the random number seed is very important. A random number seed, also referred to as a "random seed" or "seed" or "random code" or "code" is a number used by a number generator, such as a pseudorandom number generator (PRNG) used to create a stream of random numbers to initiate a secure connection. Random seeds are frequently generated by a hardware (true) random number generator (TRNG); however, in virtual environments, TRNG are not always available.

Generally, in computing environments, a PRNG is used to generate a random seed based on a state of a computing system in the environment, such as a time clock for a specific machine. TRNG, in some embodiments, are hardware-based apparatuses capable of generating a perfect or nearly perfectly strong random seed because the number stream generated by the TRNG is usually non-predictable. In computing networks, without access to a TRNG, a machine must use a PRNG, which may be a software program used to approximately generate random numbers. The purpose of the PRNG, also known as a deterministic random bit generator, is to use an algorithm to transform the random seed into a numerical stream, where the numerical stream may be a longer code or number, in order to improve the amount of randomness or entropy available for that seed. As the PRNG is generally capable of approximating random number streams, the connections based on those numerical streams may remain vulnerable to attacks. While the present disclosure utilizes TRNGs and PRNGs, the techniques of the present disclosure are usable with any suitable random number generators (RNGs) (e.g., truly random or pseudorandom number generators) where different RNGs may have different levels of trust within a system where the levels of trust may or may not correspond to actual performance characteristics of the RNGs. For example, the techniques of the present disclosure may utilize a tiered approach with different of the same type of number generator (e.g., PRNGs).

However, as a PRNG uses deterministic algorithms, which are predictable, to generate numerical streams, if the condition used to initialize the PRNG, such as the random number seed, are known, the numerical stream may be vulnerable to attack or prediction, thereby causing any connection made with the stream or seed possibly unsecure.

In alternative example embodiments, a cryptographically secure pseudorandom number generator (CSPRNG) may be used. For example, a CSPRNG may be a pseudorandom number generator with properties that make it suitable for cryptography, including, for example, using entropy obtained from a hardware random number generator or other high-quality entropy source, such as cryptographically secure pseudorandom number generators as published by the National Institute of Standards and Technology, NIS TSP 800-90A, for example. Further example embodiments may include having a cryptographically strong random number or random number seed, where one random number was generated from a high-quality entropy source, or from a process with higher entropy.

In some examples, the random number seed is used by the PRNG to generate the longer or "spread" numerical stream, which is used to initiate a secure connection. Such a connection could be made with a Transport Layer Security (TLS) or Secure Sockets Layer (SSL) cryptographic protocol designed to provide high levels of security for communications over trusted and untrusted networks, such as the Internet. The TLS protocol, for example, provides security for communications across a network or networks in a manner configured to prevent eavesdropping or attacks, such as a man-in-the-middle attack, which is one example of a cryptographic technique for active eavesdropping over a network. For example, a secure network connection or secure connection may include a connection over which communications are encrypted while in transit.

A fundamental problem that exists in virtualized computing environments includes the amount of available entropy. When new virtual computer systems are instantiated, the amount of available entropy is generally small, which means there is very little uniqueness in the virtualized environment. One result of this problem is that two or more virtual computer systems, such as virtual machines being instantiated at or around a same time may not have enough randomness to generate strong cryptography.

In one example embodiment, an entropy service is made available for newly instantiated virtual computer systems, such as virtual machines, containers and the like. The new virtual machines generate a best possible random number seed on the local virtual machine, and using that best random number seed, the virtual machine can encrypt a secure connection with the entropy service.

In some example embodiments, the entropy service may be configured to generate a stronger cryptographic random number seed that can be used to replace the cryptographically weaker seed initially generated by the virtual computer system, thereby providing each newly instantiated virtual computer system with a cryptographically strong seed to use to re-initiate a secure connection and use in all future communications. As used herein, as it relates to random number generation, cryptographic strength refers to the entropy of RNG, which is a measure of uncertainty in a random variable. The measure may be the Shannon entropy or another suitable way of measuring uncertainty in a random variable. Thus, a first random number is cryptographically stronger than a second random number if the first random number is the output of a process with higher uncertainty than another process used to obtain the second random number. A random number may be said to be cryptographically strong (without relation to another random number) if it satisfies one or more specified criteria on entropy. In some embodiments, a random number is cryptographically strong if it satisfies the requirements of the National Institute of Standards and Technology (NIST) Special Publication 800-90B which, along with NIST Special Publications 800-90A and 800-90B, are incorporated herein by reference. Other criteria may be used to determine whether a random number is cryptographically strong. Further, a first number may be said to be cryptographically stronger than a second number if the first number was generated by a process with higher entropy than a process used to generate the second number.

Alternative example embodiments provide for a method and system for co-locating a client, such as the virtual computer system, within a trusted environment that provides the initial connection between the client and the entropy service with more protection based at least in part on the trusted or mostly-trusted environment. For example, a client connected with an entropy service within a virtual private network or a virtualized private software as a service network is configured to receive the initial generated random number seed. In such an example embodiment, after receiving the stronger cryptographic seed, a client is able to reinitialize the cryptographic system with a truly randomly distributed number sequence, thus allowing the client to traverse a trusted or untrusted environment with a high level of safety because the cryptography for that virtual computer system is strong.

For example, a newly instantiated virtual machine, or any existing virtual machine, may attempt to create an encrypted connection, using an encryption protocol such as TLS or SSL, with an entropy service in order to obtain a stronger cryptography to be used for later connections in untrusted networks. In one example embodiment, an entropy service includes multiple components including, for example, an entropy server and a hardware-based random number generator, such as a True Random Number Generator (TRNG), or a random number seed produced by a hardware security module (HSM), where the random number seed produced by the HSM may be used to seed a software-based random number generator, such as a pseudo-random number generator and provide a cryptographically strong random number sequence to be provided or transmitted to the client. In some example embodiments, a hardware random number generator may generate a random number or a table or database of random numbers to be stored in a memory operably interconnected with the hardware. In such an example embodiment, when a request for a random number is transmitted, the hardware random number generator may provide a previously determined random number stored in the memory, in response to the request. A user may use the cryptographically strong random number seed as an input into a local software-based random number generator located on the client device or operably interconnected thereto. The client may use the cryptographically strong seed to reinitialize a cryptography protocol connection that the client may then use for future communications over all networks. Where in some example embodiments, a cryptographically strong seed or strong cryptography is a term applied to cryptographic systems and/or components considered to be highly resistant to cryptanalysis.

In some example embodiments, when an initial cryptographically weak or less secure connection between the client and the entropy service is engaged, which was initiated using a locally generated seed on the client device the less secure connection is maintained for a minimal amount of time necessary for the client to receive a cryptographically stronger seed from the entropy service. In some example embodiments, in an attempt to provide an initial best effort encrypted session while a second seed is being provided to the client, the connection may terminate if, for example, there is a possibility of an attacker or other risk factor. If such a termination is executed, a new session between the client and the entropy service should be made in order to protect the client device.

In some circumstances, virtual machines may be instantiated concurrently, which leaves the possibility that two separate systems may receive the same random number seed. Conventional techniques for ensuring data security typically provide high security even when two virtual machines utilize the same random number seed. However, in some circumstances, even greater security is desired. Accordingly, example embodiments of the present disclosure enhance conventional data security techniques by enabling higher entropy random number seeds in contexts where virtual machines and other computer systems do not have access to hardware-based random number generators. When a service's random number seed generator encounters a fault or failure event, the service may use the entropy service as a back-up system for their own service that would maintain strong cryptography for the clients of the service so the service does not have to rely on local random generators of the operating system's random number generator. Alternative example embodiments include vulnerabilities that exist for some population of mobile phones, which do not have high levels of entropy available to the mobile device, causing weak cryptography.

In some example embodiments, a strong cryptographic random number seed may be made more secure when included in a repetitious monitoring system. An entropy service may include a searching module to be run in the background at all times, periodically, aperiodically or upon request that would search for virtual computer systems of lowering entropy and provide for additional or progressive levels of trust. For example, if additional virtual machines are being instantiated and lowering the entropy available in the virtualized computing environment or on the host machine, the multiple newly instantiated virtual machines may be directed to use different servers in the entropy service. By delivering additional trusted connections that may provide a layered architecture where, for example, if a stronger cryptographic random number generator is detected, the virtual machine may be instructed to re-initialize the crypto-connection with the stronger generator in order to receive a cryptographically stronger seed.

Alternative example embodiments provide for a rotating source of entropy where a new connection is suggested to the virtual machine by the entropy service, a system administrator or other network component if, for example, a random number generator with better quality is detected. Alternative example embodiments provide for a system for providing a virtual machine with a stronger random number seed on a periodic, aperiodic or request-based basis in order to improve the cryptographic strength of the seed and then instructing the virtual machine to re-initialize a secure connection with the new, stronger seed.

As randomness is one of the fundamental components of cryptography, the lack of entropy can make the computer systems and the computing environment generally, vulnerable to attacks. One of the principle benefits of cryptography in general is the ability to provide very high levels of security because cryptographic security deals with large number spaces, for example $2^{128}$ or $2^{256}$. The use of such large number spaces makes it very difficult and nearly impossible for an attacker to search such a massive number space when those numbers are truly randomly distributed. However, if there is not enough entropy in the computing environment, such as the case when new computer systems are instantiated, it causes the number space to vastly decrease and become less capable of being randomly distributed. One problematic effect of this lack of entropy includes a reduction in the massive number space to only a subset of the number space, which can provide an attacker a narrower field of search, and, ultimately, a simpler way of potentially breaking the cryptography associated with those computer systems.

FIG. 1 illustrates an example of a computing environment 100 according to embodiments presented herein. In the environment illustrated in FIG. 1, interconnected components of a computing network are provided. A client node 103, which may be a virtual machine or hardware platform used by a customer, is operably interconnected to an entropy service 130 via a local or trusted connection 150 that is initiated in order to provide a secure connection. The entropy service 130 may be a computer system configured to receive requests for random number seeds and provide random number seeds in response to the request. The entropy service may be implemented as a server computer system or a fleet of server computer systems, in which case the entropy service may be considered a distributed computer system. The entropy service may provide a web service front end to which application programming interface (API) requests may be made to receive responses that include the random number seeds. Requests made to the entropy service may be representational state transfer (RESTful) requests, simple object access protocol (SOAP) requests, and/or other remote procedure calls (RPCs). In some embodiments, the entropy service processes requests synchronously where responses to the requests include the random number seeds. In other embodiments, the entropy service 130 processes requests asynchronously where a requests for a random number seed may be provided a response with an identifier of a workflow performed to generate a random number seed. A client of the entropy service 130 may, at a later time, submit a second request to the entropy service with an identifier of a workflow to obtain the random number seed. Multiple second requests may be made until the random number seed is available. To process requests asynchronously, the entropy service may write a received request to a database layer and one or more servers of the entropy service may read the database layer to locate requests to process and, upon processing a request, writing a random number seed to the database layer in association with an identifier of the workflow performed to obtain the random number seed to enable a frontend server of the entropy service to locate responses to requests to provide random number seeds (e.g., in response to a second request mentioned above.)

The client node 103 is configured to generate a random number seed 121 that may be the best possible seed (e.g., most secure) when generated on the local client device. Using the generated first seed, a connection is formed with an entropy service via the local network. In one example embodiment, the local connection is initiated so that a subsequent communication, including a second seed does not traverse a public or untrusted network, which would expose the second seed to vulnerabilities, such as man-in-the-middle attacks. At the entropy server 135, a component is enabled to generate a second, more secure seed. The entropy server may generate the second seed using a truly secure generator, such as a hardware random number generator (TRNG). In an example embodiment, the entropy server 135 may generate the second seed according to a pseudorandom number generator (PRNG) when the TRNG is busy or unavailable. For example, in some embodiments, such as when a fleet of entropy servers with TRNGs is unavailable, a TRNG can only generate a finite amount of entropy per second which, at a given time, is insufficient.

At or near the time the second seed 141 is generated, the entropy service 130 transmits the second seed back to the client devices via the local trusted network or secured channel. In some embodiments, such as some RESTful implementations, the trusted connection would close after the request is made. The client node 103 may periodically or otherwise poll another API (e.g., by identifying a workflow for generating the second seed 141) to determine the status of obtaining the seed. Such polling may require another SSL or other secure connection. Once the second seed is created, the client may receive the second seed 141 from the entropy service 130 and use the second seed 141 to make subsequent SSL or other secure connections. The second seed is considered a strong seed, according to cryptographic standards generally, a seed generated by a TRNG is a cryptographically strong random number seed. The client device receives the second seed from the entropy service and re-initializes its cryptosystem using the more secure second seed for all subsequent cryptographic operations.

For example, the client node 103, or a component thereof, generates a first seed using a PRNG 105 on the client node's local machine, such as a PRNG application on the operating system of the virtual machine or located on a host machine to which the virtual machine as access. The PRNG generates a stream of random numbers based on the first seed and uses that stream of numbers to initialize a secure cryptographic protocol module 111, such as Secure Sockets Layer (SSL) connection with the entropy service 130. The entropy service 130 uses a TRNG to generate a secure second seed for the client. The entropy service 130 may transmit the second seed via the same SSL connection, or the entropy service could negotiate a second SSL connection using more secure random numbers generated by the entropy service. When the client device receives the second seed, it re-initializes its crypto-system using the second seed, which is then used for any future communication over any public, untrusted or other type of network, such as communication over the network 110 with user device 106.

Alternative example embodiments include co-locating an entropy service and a client server such that the client connection with the entropy service is a trusted network connection through which the client server may forward a request for a second, more secure random seed. Alternate example embodiments may include additional tiers of security, such as two or more rounds of seed generation. In some embodiments, a host machine implementing a virtualization platform may implement a metadata service for virtual machines implemented by the host machine. The metadata service may be a service callable by virtual machines implemented on the host to obtain various information (metadata) about the virtual machines. The metadata service may be implemented as, for example, a process executing in a privileged domain (referred to as dom0 in some platforms). After a client node (a virtual machine implemented by the host machine) makes an initial request for a random number seed, the entropy service may push a random number seed to the host machine via an SSL or other secure connection with the host machine. The host machine may make the received seed available to the client node via the metadata service. In this manner, the client node is able to obtain the seed from the entropy service without the seed being passed over an insecure network.

The client node 103 may be any type of device that is configured to request that a code be issued, either in accordance with an automated process executing independent of user input to the client node or in accordance with an automated process executing in accordance with input received from a user. In some examples, the client node requests a random number seed as part of a launch process initiated by a control plane computer system used to manage virtual machines in a distributed computing environment. In some examples, fulfillment of an API request to launch a virtual machine may include processing a request to provision a cryptographic seed. The seed may be pushed to the virtual machine via the metadata service. In this regard, the virtual machine may not require making an SSL connection using a weaker cryptographic seed. Further, the client node 103 may be configured to receive a system-generated or submit the code for validation. For example, the client node 103 may be any type of consumer electronics device including a laptop or desktop computer, a tablet, a mobile phone or a smartphone. The client node 103 may be configured to communicate using any type of communication protocol including a cellular wireless communications protocol, such as fourth generation (4G) communications or long term evolution (LTE™), a wireless local area network (WLAN) communications protocol, such as an Institute for Electrical and Electronics Engineers (IEEE) 802.11, 802.16 or 802.21 communication protocol, or short range communications protocol, among others. The client node 103 may further be equipped with an operating system and may be configured to execute software applications and programs compatible with the operating systems.

Figure 2:
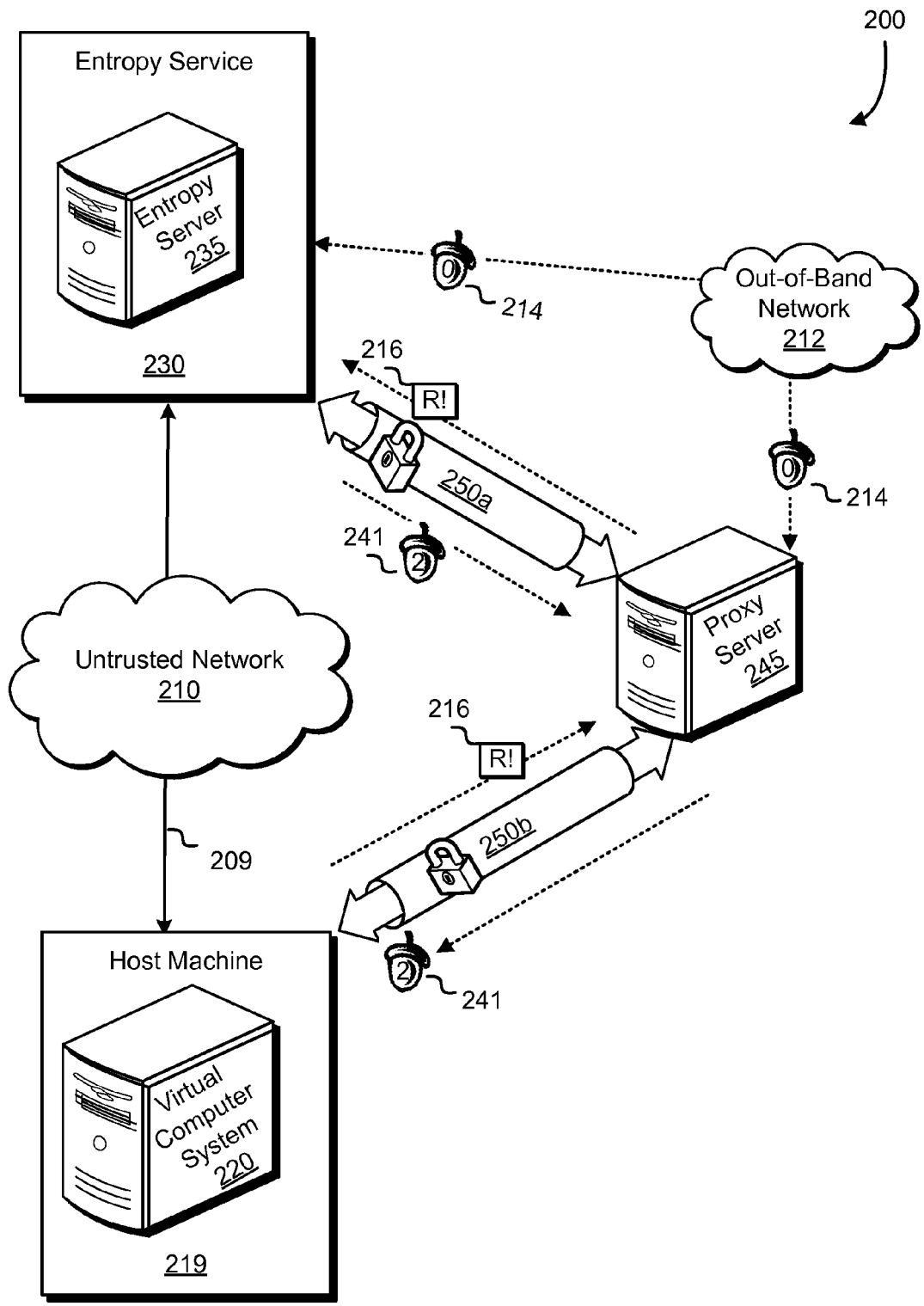
FIG. 2 shows an illustrative example of an environment in accordance with at least one embodiment.

FIG. 2 illustrates an example of a computing environment 200 showing the connections between an entropy service 230, a host machine 219, and a proxy server 245. In an example embodiment of a virtual computer system 220, which may be a guest on the host machine 219, the virtual computer system is operably interconnected with the entropy service via a public network 210, such as the Internet. The virtual computer system, such as a virtual machine, being newly instantiated on the host machine in which a low amount of entropy was available, is configured to request a strong random number seed from the entropy service 230. However, as noted above, providing a secure seed over an untrusted or unsecured network, such as the Internet, may submit the seed to unnecessary vulnerabilities, as such, the instant example embodiment includes a proxy server configured to connect to both the entropy service and to the host machine via two independent trusted network connections.

In the example embodiment, while the virtual computer system is connected with the entropy service over the network 210 via a connection 209, in place of connecting directly with the entropy service 230, the virtual computer system 220 transmits a request 216 to a proxy server 245 to be forwarded to an entropy server 235 located on or interconnected with the entropy service 230. In the context of computer networks, a proxy server is generally a computer system server or an application server that acts as an intermediary for requests transmitted from a first location to a second location. The proxy server generally is configured to intercept the request for a specified reason, such as determining a next hop for the connection, determining the availability of the requested content, controlling the request path and to provide many other services. The proxy server is operably interconnected to the host machine via connection 250b; the proxy server 245 may be co-located in the same trusted network as the host machine 219, it may use a preexisting trusted connection or other secure manner of connecting with the host machine if it were otherwise not in communication.

Unlike some of the example embodiments in FIG. 1, the virtual computer system in the instant embodiment does not need to generate a local random number seed in order to initiate a connection with the entropy service, as the proxy server provides for the necessary connection between the two computing entities. Alternative example embodiments may provide for the virtual computer system to initiate connections with multiple computing devices in addition to or in place of connecting with the entropy service.

Returning to the example embodiment of FIG. 2, the virtual computer system 220 transmits a request to the proxy server 245 requesting a strong or truly random number seed be provided by the entropy service in order to provide for a lack of available entropy on the host machine. The proxy server and the entropy server 230 may be operably interconnected via a secure, trusted network connection 250a. The secured connection may be a preexisting connection; the entities may be co-located or otherwise connected in a trusted network. In the instant example embodiment, an out-of-band network 212 is configured to provide a cryptographically strong random number seed 214 to both the entropy service 230 and the proxy server 245, where the seed 214 is used to initiate the secure connection 250a. An out-of-band mechanism is generally configured to provide data from an independent channel that is separated from the in-band data of the network. In alternative example embodiments, a trusted platform module (TPM), which is an international standard (ISO/IEC 11889) for a secure cryptoprocessor, may be used as a number generator.

In alternative example embodiments, the out-of-band network 212 may provide the seed 214 to only one of the computing entities either to the proxy server or to the entropy server, and that entity would initiate a trusted connection. Once the secured, trusted connection 250a is completed, the proxy server may transmit or forward the request 216, originally from the virtual computer system, to the entropy service 230. Upon receipt of the request, the entropy service, via the entropy server 235 or other service component or infrastructure, is configured to generate a strong random number seed 241 to return to the virtual computer system for use in forming secure network connections. The entropy service may transmit the generated seed 241 to the proxy server, which would in turn forward the seed 241 to the virtual computer system. After receiving the seed 241 and initiating a cryptography protocol connection, such as an SSL or TLS protocol, the virtual computer system may then connect with the entropy server over the connection 209 via the untrusted network 210 using the cryptographically strong random number seed provided by the entropy service.

In alternative example embodiments, the entropy service may return an error or notification to the virtual computer system, via the proxy or via the unsecure connection 209, that the entropy service could not generate the requested seed. In further alternative example embodiments, there may be more than one proxy server and/or more than one secured, trusted connections between any or all of the computing entities in the computing environment.

Figure 3:
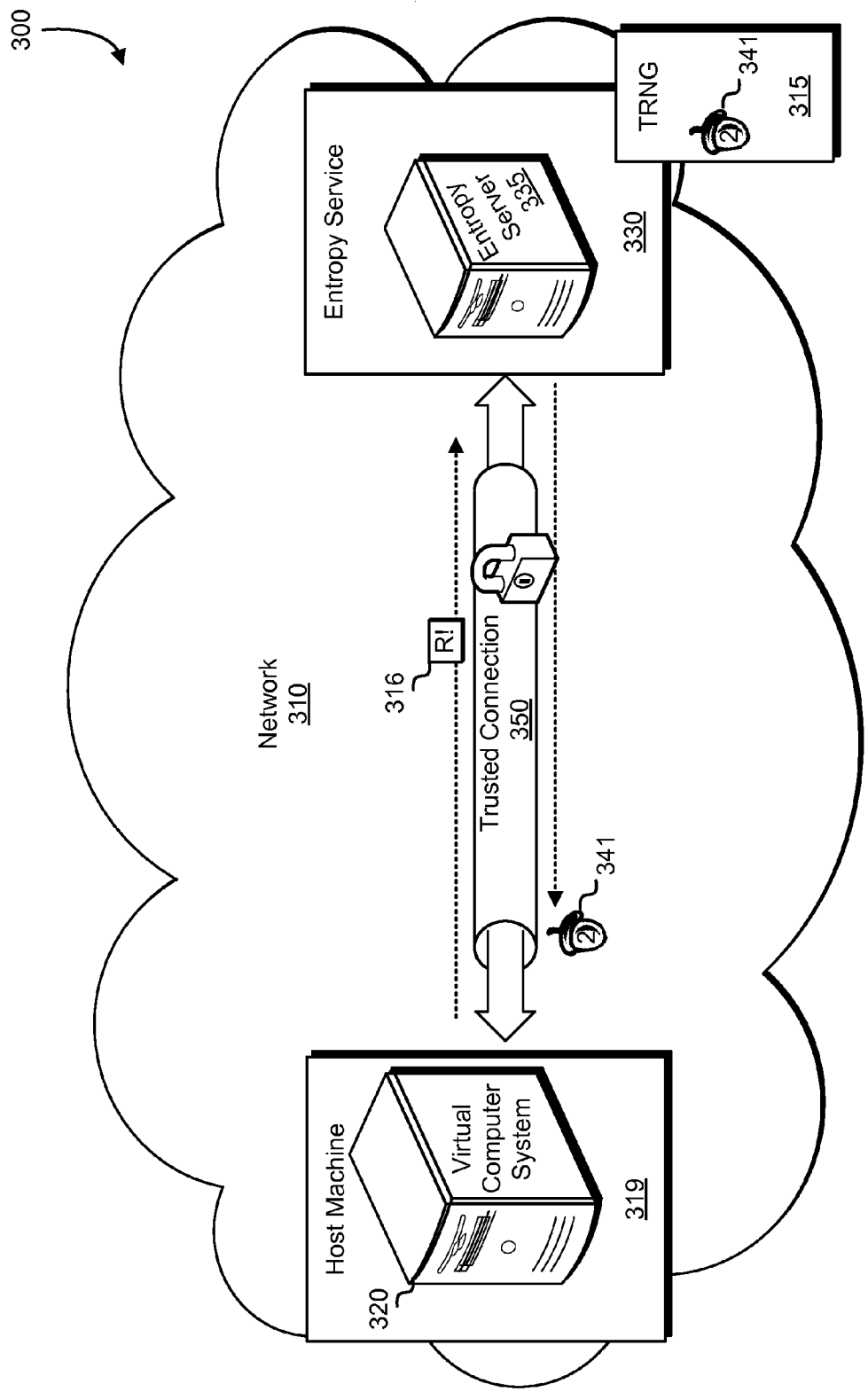
FIG. 3 shows an illustrative example of an environment, in accordance with at least one embodiment.

FIG. 3 illustrates an example of a computing environment 300 showing a secured connection between a host machine 319 and an entropy service 330 in a co-located network 310. In the example embodiment of FIG. 3, the virtual computer system 320, which may be a virtual machine, transmits a request 316 to the entropy service requesting a strong random number seed for use in secured connections over untrusted and trusted networks. The connection between the virtual computer system and the entropy server 335, which is located on the entropy service 330 or otherwise operably interconnected thereto, is a secure/trusted connection. Therefore, the virtual computer system does not need to generate a first, local random number seed to use to form a connection with the entropy service, as is done in the example embodiment of FIG. 1. However, alternative example embodiments may include the virtual computer system generating a seed to form a connection if desired for any purpose.

The entropy service 330 may receive the request 316 from the virtual computer system and provide it to the entropy server 335 for processing of the request and generating the strong seed. The entropy server 335 may be operably interconnected with a hardware (true) random number generator (TRNG), such as the TRNG 315. The TRNG 315 may reside within the entropy service 330 or otherwise be an interconnected component thereof. The TRNG may generate a secure random number seed 341 to provide to the entropy server to transmit to the virtual computer system over the secure connection 350. In alternative example embodiments, the TRNG may be configured to transmit the generated seed 341 directly to the virtual computer system.

In alternative example embodiments, more than one secure, trusted connection (similar to connection 350) may connect the host machine and entropy service. Where one connection or tunnel may be used, for example, to receive requests and the other used, for example, to transmit responses. Alternative example embodiments may provide for multiple host machines or other network components for maintaining virtual computer systems in the same co-located network using the same or different connections. In addition, some such example embodiments may include the computing entities of network 310 being operably interconnected with other computing systems and networks via additional secure and/or unsecure connections.

Figure 4:
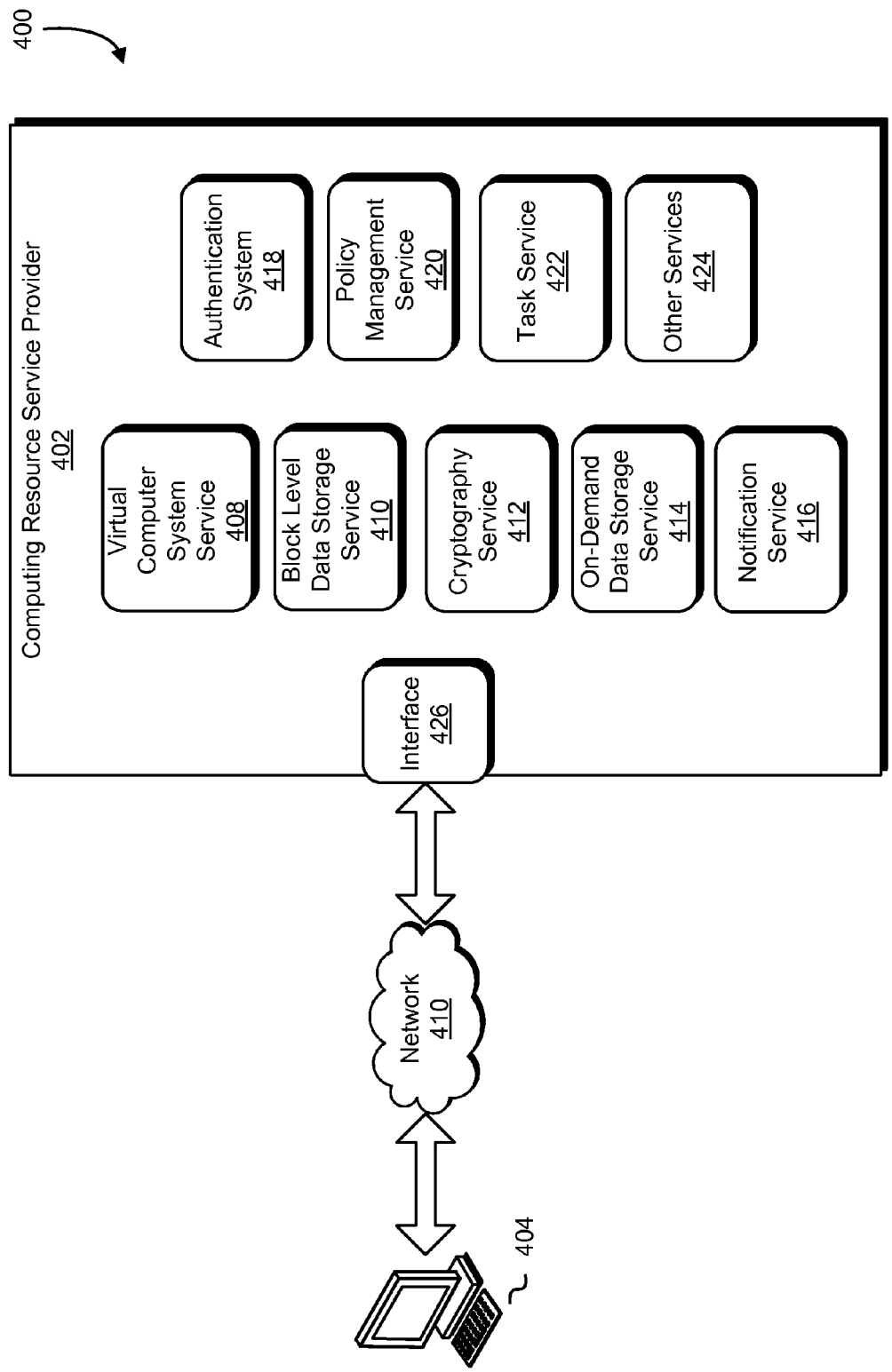
FIG. 4 shows an illustrative example of a computing resource service provider in accordance with at least one embodiment.

FIG. 4 shows an example of a customer connected to a computing resource service provider in accordance with at least one embodiment. The computing resource service provider 402 may provide a variety of services to the customer 404, wherein the customer may be the owner or user of the client device as illustrated in FIGS. 1-3, and the customer 404 may communicate with the computing resource service provider 402 via an interface 426, which may be a web services interface or any other type of customer interface. While FIG. 4 shows one interface 426 for the services of the computing resource service provider 402, each service may have its own interface and, generally, subsets of the services may have corresponding interfaces in addition to or as an alternative to the interface 426. The customer 404 may be an organization that may utilize one or more of the services provided by the computing resource service provider 402 to maintain and deliver information to its employees, which may be located in various geographical locations. Additionally, the customer 404 may be an individual that utilizes the services of the computing resource service provider 402 to deliver content to a working group located remotely. As shown in FIG. 4, the customer 404 may communicate with the computing resource service provider 402 through a network 406, whereby the network 406 may be a communication network, such the Internet, an intranet or an Internet service provider (ISP) network. Some communications from the customer 404 to the computing resource service provider 402 may cause the computing resource service provider 402 to operate in accordance with one or more embodiment described herein or a variation thereof.

The computing resource service provider 402 may provide various computing resource services to its customers. The services provided by the computing resource service provider 402, in this example, include a virtual computer system service 408, a block-level data storage service 410, a cryptography service 412, an on-demand data storage service 414, a notification service 416, an authentication system 418, a policy management service 420, a task service 422 and one or more other services 424. It is noted that not all embodiments described herein include the services 408-424 described with reference to FIG. 4 and additional services may be provided in addition to or as an alternative to services explicitly described herein. As described herein, each of the services 408-424 may include one or more web service interfaces that enable the customer 404 to submit appropriately configured API calls to the various services through web service requests. In addition, each of the services may include one or more service interfaces that enable the services to access each other (e.g., to enable a virtual computer system of the virtual computer system service 408 to store data in or retrieve data from the on-demand data storage service 414 and/or to access one or more block-level data storage devices provided by the block level data storage service 410).

The virtual computer system service 408 may be a collection of computing resources configured to instantiate virtual machines on behalf of the customer 404. The customer 404 may interact with the virtual computer system service 408 (via appropriately configured and authenticated API calls) to provision and operate virtual computer systems that are instantiated on physical computing devices hosted and operated by the computing resource service provider 402. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 408 is shown in FIG. 4, any other computer system or computer system service may be utilized in the computing resource service provider 402, such as a computer system or computer system service that does not employ virtualization or instantiation and instead provisions computing resources on dedicated or shared computers/servers and/or other physical devices.

The block-level data storage service 410 may comprise one or more computing resources that collectively operate to store data for a customer 404 using block-level storage devices (and/or virtualizations thereof). The block-level storage devices of the block-level data storage service 410 may, for instance, be operationally attached to virtual computer systems provided by the virtual computer system service 408 to serve as logical units (e.g., virtual drives) for the computer systems. A block-level storage device may enable the persistent storage of data used/generated by a corresponding virtual computer system where the virtual computer system service 408 may only provide ephemeral data storage.

The computing resource service provider 402 also includes a cryptography service 412. The cryptography service 412 may utilize one or more storage services of the computing resource service provider 402 to store keys of the customers in encrypted form, whereby the keys may be usable to decrypt customer 412 keys accessible only to particular devices of the cryptography service 412.

The computing resource service provider 402 further includes an on-demand data storage service 414. The on-demand data storage service 414 may be a collection of computing resources configured to synchronously process requests to store and/or access data. The on-demand data storage service 414 may operate using computing resources (e.g., databases) that enable the on-demand data storage service 414 to locate and retrieve data quickly, to allow data to be provided in responses to requests for the data.

In the environment illustrated in FIG. 4, a notification service 416 is included. The notification service 416 may provide notifications to clients using a "push" mechanism without the need to periodically check or "poll" for new information and updates. The notification service 416 may further be used for various purposes such as monitoring applications executing in the virtual computer system service 408, workflow systems, time-sensitive information updates, mobile applications and many others.

As illustrated in FIG. 4, the computing resource service provider 402, in various embodiments, includes an authentication system 418 and a policy management service 420. The authentication system 418, in an embodiment, is a computer system (i.e., collection of computing resources) configured to perform operations involved in authentication of users of the customer. For instance, one of the services 408-416 and 420-424 may provide information from a user to the authentication service 418 to receive information in return that indicates whether or not the user requests are authentic.

The policy management service 420, in an embodiment, is a computer system configured to manage policies on behalf of customers (such as customer 404) of the computing resource service provider 402. The policy management service 420 may include an interface that enables customers to submit requests related to the management of policy. Such requests may, for instance, be requests to add, delete, change or otherwise modify policy for a customer or for other administrative actions, such as providing an inventory of existing policies and the like.

The computing resource service provider 402, in various embodiments, is also equipped with a task service 422. The task service 422 is configured to receive a task package from the customer 404 and enable executing tasks as dictated by the task package. The task service 422 may be configured to use any resource of the computing resource service provider 402, such as one or more instantiated virtual machines or virtual hosts, for executing the task. The task service 424 may configure the one or more instantiated virtual machines or virtual hosts to operate using a selected operating system and/or a selected execution application in accordance with a requirement of the customer 404.

The computing resource service provider 402 additionally maintains one or more other services 424 based at least in part on the needs of its customers 404. For instance, the computing resource service provider 402 may maintain a database service for its customers 404. A database service may be a collection of computing resources that collectively operate to run one or more databases for one or more customers 404. The customer 404 may operate and manage a database from the database service by utilizing appropriately configured API calls. This, in turn, may allow a customer 404 to maintain and potentially scale the operations in the database. Other services include, but are not limited to, object-level archival data storage services, services that manage and/or monitor other services and/or other services.

Figure 5:
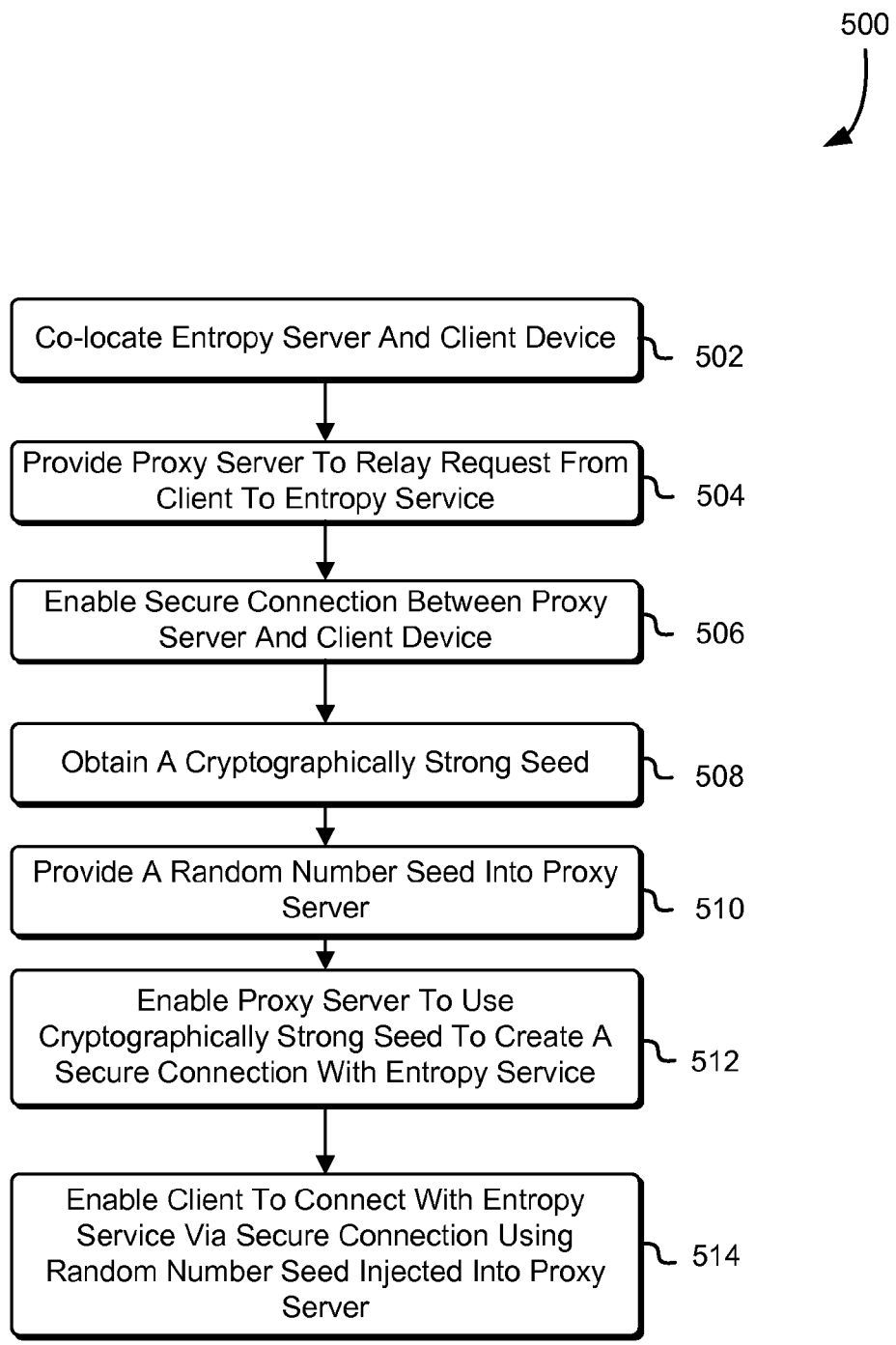
FIG. 5 shows an illustrative example of a process for processing a request for a random number seed via a proxy server in accordance with at least one embodiment.

FIG. 5 illustrates an example process 500 disclosing a method of connecting a client device to an entropy service via a proxy server. The example embodiment of process 500 may be performed by an administrator or program controlling a proxy server, such as the proxy server 245 described and illustrated in connection with FIG. 2.

The process 500 begins with a controller configuring a proxy server in the same area of a local network as a client device (502) or otherwise co-locates the proxy server and the client device such that there is a secure and/or trusted connection between the two entities. The controller configures or programs the proxy server to be a relay server between the client device and an entropy service (504), where the entropy service is located in an untrusted network, such as the Internet. The process 500 continues, the controller is configured to enable a secure connection between the proxy server and the co-located client device (506) and obtain a cryptographically strong random number seed (508). The cryptographically strong seed may be supplied by an out-of-band network, such as the out-of-band network 212 described and illustrated in connection with FIG. 2. In some embodiments, the proxy server has its own local TRNG or at least a RNG that operates with higher entropy than that of the client. In such embodiments, the proxy server may obtain 508 the cryptographically strong seed from its local RNG.

Returning to FIG. 5, the controller provides the seed to the proxy server (510). By providing the cryptographically strong seed directly to the proxy server, no intermediary or untrusted networks would have access to the seed causing possible vulnerabilities. Returning to the process 500, after providing the seed to the proxy server, the proxy server is configured to use the seed to create a secure connection between the proxy server and the entropy service, located on an untrusted network (512). Upon confirming a secure connection has been formed between the proxy server and the entropy service, the controller enables the client to communicate with the entropy service over the secured connection via the proxy server (514).

A proxy service may be used to relay a request from a client on a private network to the entropy service, which resides on an untrusted network, such as the internet. The proxy service relays the client request to the entropy service via a secure connection using a second (strong) seed that can be provided by an out-of-band source or via a Trusted Platform Module (TPM). Such an example embodiment enables an administrator to inject a random number seed into the proxy server so it may connect securely to the entropy service. This method of providing a random number seed avoids the need to inject the random number seed into any other local servers; thereby providing a secure random number seed protecting communications, from the client device via untrusted or unsecured networks, from attacks, such as man-in-the-middle attacks or the like.

Figure 6:
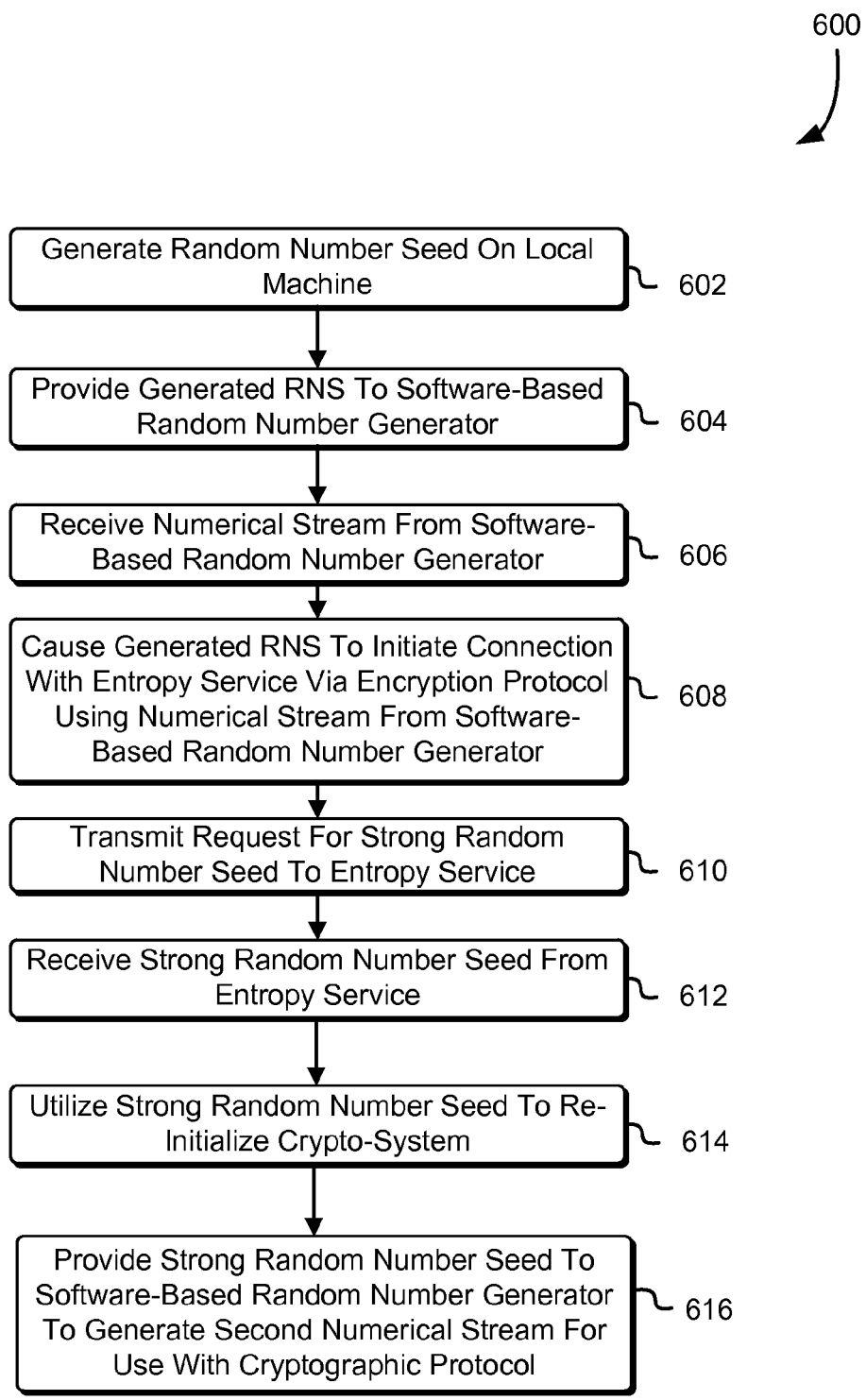
FIG. 6 shows an illustrative example of a process for processing a request for a random number seed via a proxy server in accordance with at least one embodiment.

FIG. 6 illustrates an example process 600 disclosing a method of requesting a cryptographically strong random number seed from an entropy service. The example embodiment of process 600 may be performed by a client device or appropriate component thereof, such as client node 103 described and illustrated in connection with FIG. 1.

The process 600 begins with a virtual machine, running on a client device or host machine, generating a random number seed on the local virtual machine (602). As the local machine may not have enough available entropy to allow for a secure cryptography seed to be provided to all new virtual machines, the virtual machine is instructed to generate the best (most secure) seed possible. In many instances, a seed will be generated by a pseudorandom number generator, which may be a software application running on the virtual machine or on the host machine and accessible by the virtual machine.

Returning to the process 600, the virtual machine provides the generated random number seed to a software-based random number generator (604). The random number generator is configured to stretch the seed according to, for example, a deterministic algorithm, in order to add randomness and/or uniqueness to the seed. The virtual machine receives the numerical stream from the random number generator (606) and causes a secure connection to be initiated using the numerical stream generated by the random number generator (608). The process 600 continues by the virtual machine transmitting a request to an entropy service (610), whether the request is a request for a cryptographically strong random number seed that is generated by the entropy service or a component thereof, such as the true rand number generator (TRNG) 315 described and illustrated in connection with FIG. 3.

Retuning to FIG. 6, the process 600 continues by the virtual machine receiving the requested strong seed (612) and utilizing the strong seed to re-initialize the cryptographic system (614) in order to have all future connections be protected using the strong seed. The virtual machine then provides the strong random number seed to the software-based random number generator (616) to be "stretched" into a more unique configuration and to be used by a cryptographic protocol to initiate a secure connection.

Figure 7:
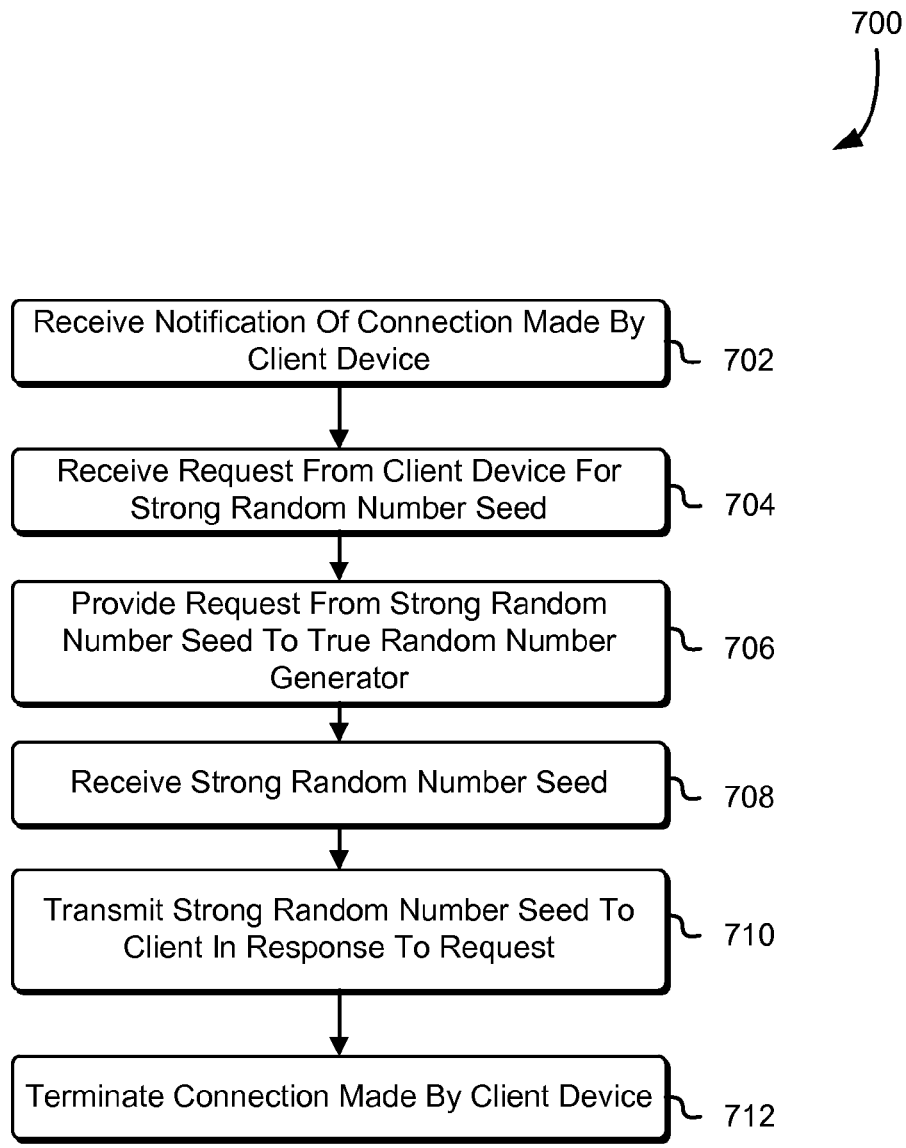
FIG. 7 shows an illustrative example of a process for processing a request for a random number seed at an entropy service in accordance with at least one embodiment.

FIG. 7 illustrates an example process 700 disclosing a method of providing a strong random number seed to a client in response to a request. The example embodiment of process 700 may be performed by any service configured to provide random number generation, such as the entropy service 130 described and illustrated in connection with FIG. 1.

The process 700 begins with an entropy service receiving a notification of a connection initiated by a virtual machine (702). The entropy service receives a request for a strong seed sent from the virtual machine (704) and forwards the request to a true random number generator (TRNG) apparatus for generating a cryptographically strong random number seed (706). The entropy service receives the strong seed from the TRNG (708), which may be a component of the entropy service or a hardware apparatus operably interconnected with the entropy service or accessible thereto. Returning to the process 700, the entropy service transmits the strong seed to the virtual machine in response to the request (710) and, upon the strong seed being transmitted successfully, the entropy service terminates the connection with the virtual machine (712).

Figure 8:
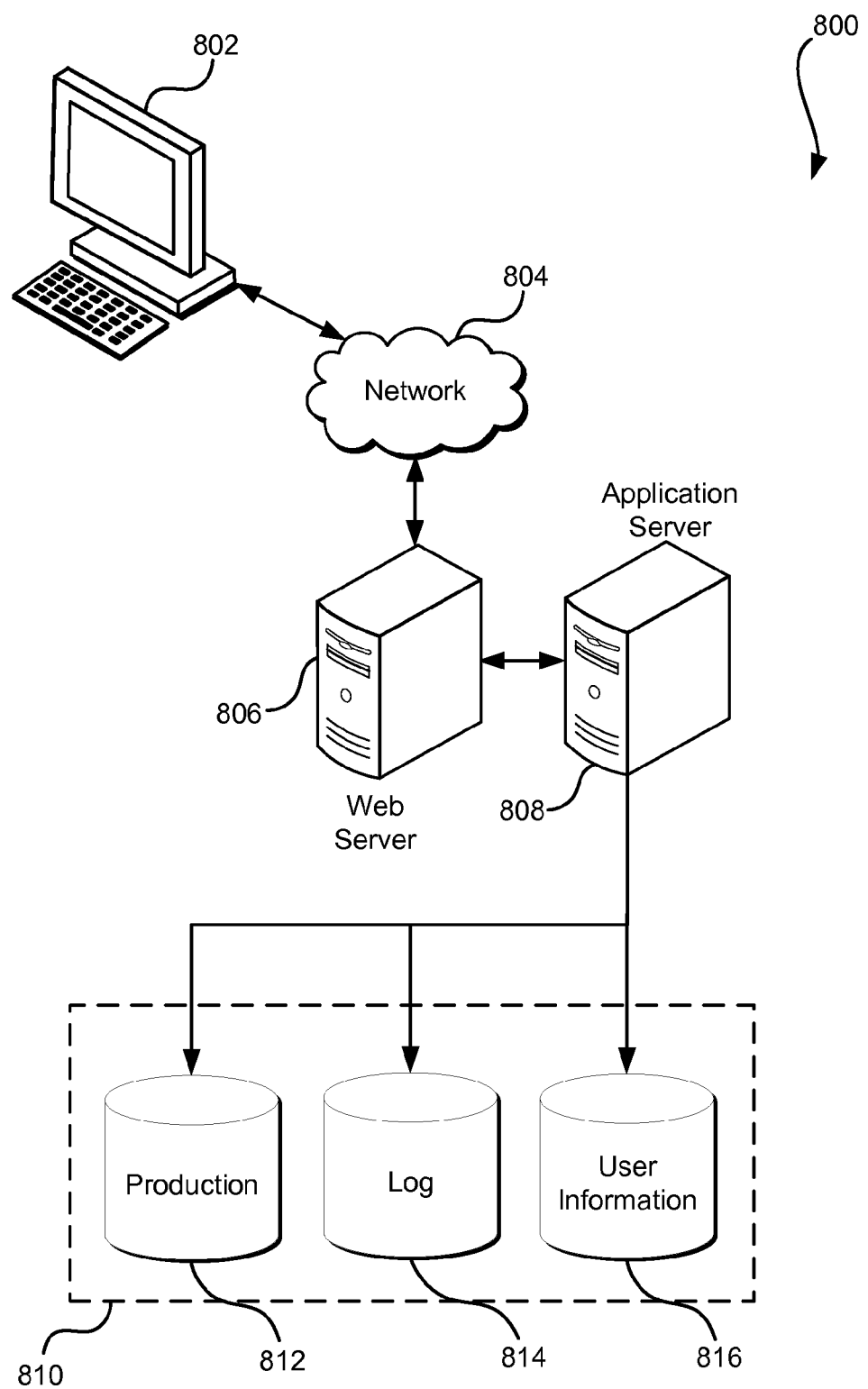
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for providing a secure random number code, comprising:
   receiving, at a computer system with a hardware random number generator, a request over a secure communications connection, the secure communications connection being established based at least in part on a first random code generated by a client transmitting the request, and the request being for a second random code; and
   as a result of receiving the request:
      generating the second random code using the hardware random number generator, the second random code being cryptographically-stronger than the first random code; and
      providing, to the client, the generated second random code.

2. The computer-implemented method of claim 1, wherein the secure communications connection established by the client is a temporary connection, the temporary connection terminating when the client receives the secure random code.

3. The computer-implemented method of claim 1, wherein the client and the computer system with the hardware random number generator are co-located, the co-location enabling the client and the hardware random number generator to communicate over a local and/or trusted network.

4. The computer-implemented method of claim 1, further comprising updating one or more accounting records to indicate usage, by an entity associated with a computer system that submitted the request, of an entropy service that provides random number seeds in exchange for value.

5. A system, comprising:
   at least one computing device configured to implement one or more services, wherein the one or more services:
      receive a request over a secure network connection, the secure network connection being established based at least in part on an initial code generated by a requestor, the request being for a first code;
      utilize a random number generator to generate the first code; and
      provide the generated first code via the secure network connection in response to the request.

6. The system of claim 5, wherein:
   the system provides the generated first code to a process in a privileged domain of a hypervisor that hosts a virtual machine; and
   the virtual machine obtains the first code from the process in the privileged domain and uses the first code to establish a secure communication channel.

7. The system of claim 5, wherein the random number generator is a hardware random number generator.

8. The system of claim 5, wherein the first code is to be utilized for all future communications over the network connection or a different network connection.

9. The system of claim 5, wherein:
   the system includes a client;
   the request is received from the client;

the network connection is a Secure Sockets Layer (SSL) protocol connection or a Transport Layer Security (TLS) protocol connection with the client; and the first code is provided to a random bit generator to generate a numerical stream to use with the SSL or TLS protocol connection.

10. The system of claim 9, wherein the random bit generator is a cryptographically secure pseudorandom number generator or a pseudorandom number generator.

11. The system of claim 5, wherein the request received via a web service interface.

12. The system of claim 5, wherein the random number generator generates the random number as a result of receipt of the request.

13. The system of claim 5, wherein:

the system further comprises a proxy server connected with an entropy service over the network connection;

the request is received as a result of the proxy server relaying the request from a client over the network connection; and the generated first code is provided to the client over a second network connection.

14. A non-transitory computer-readable storage medium having stored thereon executable instructions that, when executed by one or more processors of a computer system, cause the computer system to at least:

generate, at the computer system, a first random number code;

provide the generated first random number code to a first random number generator at the computer system;

initiate a cryptographic protocol for a first secure communications connection with another computer system using an output from the first random number generator; and utilize the secure communications connection to obtain a second random number code from a second random number generator, wherein the second random number generator has higher entropy than the first random number generator.

15. The non-transitory computer-readable storage medium of claim 14, wherein the computer system is a virtual computer system and wherein the instructions further comprise instructions that, when executed by the one or more processors, cause the virtual computer system to utilize a state of the virtual computer system to generate the first random number code.

16. The non-transitory computer-readable storage medium of claim 14, wherein the instructions that cause the computer system to obtain the second random number code further include instructions that cause the computer system to reinitiate a network connection utilizing the obtained second random number code to obtain a third random number code to replace the second random number code.

17. The non-transitory computer-readable storage medium of claim 14, wherein the instructions that cause the computer system to obtain the second random number code cause the computer system to transmit a web service request to the other computer system over a network and receive, in a response to the request, the second random number code.

18. The non-transitory computer-readable storage medium of claim 17, wherein the instructions that cause the computer system to obtain the second random number code further include instructions that cause the computer system to obtain the second random number code produced by a hardware security module (HSM).

19. The non-transitory computer-readable storage medium of claim 14, wherein the instructions further comprise instructions that, when executed by the one or more processors, cause the computer system to connect a proxy server and the computer system over a first trusted connection, the proxy server being configured to relay at least a request message from the computer system to an entropy service via an untrusted network.

* * * * *

UNITED STATES PATENT AND TRADEMARK OFFICE
CERTIFICATE OF CORRECTION

| | | |
|---|---|---|
| PATENT NO. | : 9,749,127 B1 | |
| APPLICATION NO. | : 14/294997 | |
| DATED | : August 29, 2017 | |
| INVENTOR(S) | : Andrew Jeffrey Doane and Todd Lawrence Cignetti | |

It is certified that error appears in the above-identified patent and that said Letters Patent is hereby corrected as shown below:

In the Specification

Column 3, Line 6:
NIS T SP 800-90A

Should read as:
NIST SP 800-90A

Signed and Sealed this
Seventh Day of November, 2017

Joseph Matal
*Performing the Functions and Duties of the*
*Under Secretary of Commerce for Intellectual Property and*
*Director of the United States Patent and Trademark Office*